(12) United States Patent
Ayyappan

(10) Patent No.: US 11,110,914 B2
(45) Date of Patent: Sep. 7, 2021

(54) AUTOMATIC PARKING FOLLOWING AN ABORTED MANUAL PARKING PROCEDURE

(71) Applicant: VALEO Schalter und Sensoren GmbH, Bietigheim-Bissingen (DE)

(72) Inventor: Thirumalai Kumarasamy Ayyappan, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 316 days.

(21) Appl. No.: 16/013,400

(22) Filed: Jun. 20, 2018

(65) Prior Publication Data
US 2018/0370525 A1    Dec. 27, 2018

(30) Foreign Application Priority Data
Jun. 21, 2017 (DE) ...................... 10 2017 113 663.0

(51) Int. Cl.
*B60W 30/06* (2006.01)
*B62D 15/02* (2006.01)
*G06K 9/00* (2006.01)

(52) U.S. Cl.
CPC ......... *B60W 30/06* (2013.01); *B62D 15/0285* (2013.01); *G06K 9/00812* (2013.01); *B60W 2520/10* (2013.01); *B60W 2540/30* (2013.01); *B60W 2554/801* (2020.02)

(58) Field of Classification Search
CPC ........... B60W 30/06; B60W 2554/801; B60W 2520/10; B60W 2540/30; B62D 15/0285; G06K 9/00812
See application file for complete search history.

(56) References Cited

U.S. PATENT DOCUMENTS

| | | | | |
|---|---|---|---|---|
| 2011/0121994 | A1* | 5/2011 | Pampus | G01S 15/931 340/932.2 |
| 2013/0073119 | A1* | 3/2013 | Huger | B62D 15/027 701/1 |

(Continued)

FOREIGN PATENT DOCUMENTS

| | | |
|---|---|---|
| DE | 10 2005 046827 A1 | 4/2006 |
| DE | 102007049965 A1 | 4/2009 |
| DE | 102008000575 A1 | 9/2009 |

OTHER PUBLICATIONS

European Search Report in corresponding German Application No. 18178166.7-1013/3418163, dated Jan. 3, 2019 (7 pages).

*Primary Examiner* — Bhavesh V Amin
(74) *Attorney, Agent, or Firm* — Osha Bergman Watanabe & Burton LLP

(57) ABSTRACT

The aim of the invention is to be able to easily complete a parking operation following an aborted manual parking procedure. To this end, the invention proposes a method in which a parking assistant of the vehicle (1) is activated in the parking space (2) and data relating to the area surrounding the vehicle (1) is recorded. A starting region (7) outside the parking space (2) for automatically parking the vehicle (1) in the parking space is determined from the said data. The vehicle (1) is then automatically guided or driven out of the parking space (2) into the starting region (7). From there, the vehicle (1) is automatically parked or guided in/into the parking space (2).

12 Claims, 1 Drawing Sheet

(56) References Cited

U.S. PATENT DOCUMENTS

| | | | | |
|---|---|---|---|---|
| 2013/0162829 A1* | 6/2013 | Kadowaki | ................ | B60R 1/00 |
| | | | | 348/148 |
| 2015/0151789 A1* | 6/2015 | Lee | ................ | G08G 1/165 |
| | | | | 701/41 |
| 2016/0114797 A1* | 4/2016 | Stefan | ................ | B62D 15/0285 |
| | | | | 701/41 |
| 2017/0072947 A1* | 3/2017 | Lavoie | ................ | B62D 15/0285 |
| 2017/0106856 A1* | 4/2017 | Kim | ................ | G06K 9/00798 |
| 2017/0144656 A1* | 5/2017 | Kim | ................ | B62D 15/0285 |
| 2017/0183001 A1* | 6/2017 | Yamamoto | ................ | B60W 10/10 |
| 2017/0229020 A1* | 8/2017 | Colella | ................ | B60W 10/20 |
| 2017/0253236 A1* | 9/2017 | Hayakawa | ................ | B60W 30/06 |
| 2017/0297624 A1* | 10/2017 | Noh | ................ | G08G 1/143 |
| 2018/0129218 A1* | 5/2018 | Kato | ................ | G05D 1/0231 |
| 2018/0162384 A1* | 6/2018 | Kim | ................ | B62D 15/0285 |
| 2018/0162385 A1* | 6/2018 | Seo | ................ | B60W 10/06 |
| 2018/0186407 A1* | 7/2018 | Kim | ................ | B62D 15/0285 |
| 2018/0315312 A1* | 11/2018 | Hayakawa | ................ | B60W 30/06 |
| 2019/0185055 A1* | 6/2019 | Iwami | ................ | B62D 15/0285 |
| 2019/0197322 A1* | 6/2019 | Suzuki | ................ | G06K 9/00805 |
| 2019/0322318 A1* | 10/2019 | Hasejima | ................ | B62D 15/028 |
| 2020/0023833 A1* | 1/2020 | Martin | ................ | B60W 10/184 |

* cited by examiner ions of the parking space are determined. A trajectory of the vehicle for completing the parking procedure is then determined. The driver is given the option of then subsequently receiving assistance from the parking system if he had not initially activated the said parking system. If it is established that a parking space is not suitable since it is actually too small for a parking procedure, this is indicated to the driver. If, however, parking is still possible, the driver is preferably guided to a position from which he can drive into the parking space in a suitable manner. Given a corresponding parking trajectory, the driver is initially guided to a reversing point from which he arrives at the ideal parking position via a further trajectory.

AUTOMATIC PARKING FOLLOWING AN ABORTED MANUAL PARKING PROCEDURE

The present invention relates to a method for parking a vehicle in a parking space. The present invention furthermore relates to a vehicle comprising a parking assistant which facilitates execution of a completely manual attempt to park in a parking space and activation of the said parking assistant in the parking space, and also comprising a sensor device for recording data relating to the area surrounding the vehicle.

Here, a parking assistant is understood to be software or hardware which assists the driver of a vehicle during parking. A vehicle can be, for example, a passenger car, a heavy goods vehicle or a similar means of transportation. Furthermore, the vehicle can also be provided with a trailer.

During automatic parking, the vehicle automatically searches for a parking space and then moves the vehicle into the parking space in a fully automatic manner. The driver of the vehicle does not have to intervene at all. Here, parking is carried out by a parking assistant of the vehicle in a fully autonomous manner. During semi-automatic parking however, the parking assistant assists the driver during parking. This can be configured, for example, such that the parking assistant takes over all functions apart from, for example, acceleration and braking. In another refinement, the parking assistant merely indicates a possible route which the driver has to follow manually.

During manual parking however, the driver is entirely on his own. The said driver has to search for the parking space and park in the said parking space without the assistance of a parking assistant. In this situation, the parking assistant can, for example, be deactivated or not be present at all.

During manual parking, the situation often occurs that the driver incorrectly estimates the parking space and/or the position of his vehicle and/or the manoeuvrability of his vehicle. This can lead to the driver not arriving at a desired target position during the parking attempt. Instead, the said driver only arrives at a position in which he cannot complete the parking procedure (also called: "stuck in the parking space" in the text which follows). This results in the said driver generally having to manoeuvre the vehicle completely out of the parking space in order to start a parking procedure once again. The driver may search for a different start position during the second attempt.

Document DE 10 2007 049 965 A1 discloses a method for outputting parking instructions. The instructions are used to reach a target position in a parking space, wherein initially data about the parking space is automatically recorded and a trajectory for reaching the target position is calculated on the basis of a current position and orientation of the vehicle. The parking instructions guide the driver of the vehicle along the trajectory. It is provided that the data about the parking space is stored in an electrical memory until the vehicle reaches the target position or the driver ultimately aborts the parking procedure. If the driver starts a further parking attempt, he can allow a new trajectory for reaching the target position to be determined on the basis of the current vehicle position and orientation. In another embodiment, the driver is requested to abort his parking attempt. The driver is then, for example, requested to move the vehicle to an arbitrary or to a specific starting position from which it is intended that a new parking attempt will take place. The prespecified starting position is advantageously situated within defined tolerance ranges.

Furthermore, document DE 10 2005 046 827 A1 discloses a method for parking assistance. Here, in the case of as yet incomplete, at least partial positioning of the vehicle in a parking space, the dimensions of the parking space are determined. A trajectory of the vehicle for completing the parking procedure is then determined. The driver is given the option of then subsequently receiving assistance from the parking system if he had not initially activated the said parking system. If it is established that a parking space is not suitable since it is actually too small for a parking procedure, this is indicated to the driver. If, however, parking is still possible, the driver is preferably guided to a position from which he can drive into the parking space in a suitable manner. Given a corresponding parking trajectory, the driver is initially guided to a reversing point from which he arrives at the ideal parking position via a further trajectory.

The object of the present invention is therefore to better assist the driver following a failed parking attempt.

According to the invention, this object is achieved by a method and a vehicle according to the independent claims. Advantageous developments of the invention can be found in the dependent claims.

Accordingly, the invention provides a method for parking a vehicle in a parking space. The parking space has to be large enough that the vehicle can park in a predetermined manner. Prespecified distances from the edges of the parking space may have to be complied with. Execution of a completely manual parking procedure into the parking space is initially performed. This means that the driver attempts to park the vehicle in the parking space without assistance from a parking assistant. If, for example, the manual parking attempt fails, a parking assistant of the vehicle is activated in the parking space. During activation of the parking assistant, the vehicle is not yet located in the desired target position in the parking space. Instead, the vehicle is located, for example, only partially in the parking space or is located, for example, completely in the parking space but the orientation is not ideal. In this case, the parking assistant can be manually or automatically activated. Automatic activation can be performed, for example, by it being possible to conclude from recording of data relating to the vehicle and to the surrounding area that a parking procedure should be performed.

At the same time as activation of the parking assistant or even before this, data relating to the area surrounding the vehicle is recorded. This data relating to the surrounding area is required for the further parking procedure. In the process, the vehicle may identify the dimensions of the parking space, the surrounding area in front of the parking space and possibly also the traffic in front of the parking space. Under certain circumstances, further data is also recorded and provided by the sensor system of the vehicle.

The parking assistant then determines a starting region outside the parking space for automatically parking the vehicle in the parking space on the basis of the data relating to the surrounding area. Once the completely manual parking attempt has been aborted, the parking assistant takes over the parking procedure. To this end, the parking assistant initially determines an (ideal) starting region from which manoeuvring into the parking space is possible. The vehicle is then automatically guided or driven out of the current position in the parking space into the starting region by the parking assistant. This means that, following the aborted manual parking attempt, the vehicle is automatically driven out or, for example by means of a calculated trajectory, guided out of the current position in which it is "stuck" in the parking space, by the parking assistant. Therefore, the vehicle is fully automatically or partially automatically guided out or driven out of the current position, which is located at least partially in the parking space, into the starting region. Finally, the vehicle is automatically parked, from the starting region, in the parking space by the parking assistant. As an alternative, the driver can once again, starting from the respective position in the starting region, be shown a trajectory along which he must drive in order to arrive at an automatically generated target position in the parking space. In each case, the driver is provided with the option of still reaching a (desired) target position in the parking space following an aborted manual parking attempt.

In one development, the vehicle is automatically guided into the starting region and the parking assistant ascertains whether the vehicle is in a starting position in the starting region and, if this is the case, the vehicle is automatically or partially automatically parked in the parking space from the starting position. Therefore, the said vehicle is initially semi-automatically driven out of the undesired position in the parking space and a check is automatically made to determine whether the driver was able to move his vehicle into a starting position in the starting region. An (automatic) parking procedure into the parking space is possible only from there.

In a further embodiment, the vehicle is automatically driven to a target position in the parking space by the parking assistant. The vehicle therefore automatically drives from the starting region into the parking space, specifically to an exact target position. In this way, the driver is relieved of a new parking attempt. However, if the driver wishes to manually park in the parking space from the starting region again, he can set the parking assistant to semi-automatic mode or even completely deactivate the said parking assistant.

In one refinement, the starting region is situated parallel in relation to a roadway on which the parking space is located. Parking areas are generally situated at the edge of a roadway. The parking areas can be arranged parallel in relation to the roadway, perpendicular to the roadway or, for example, in a fishbone pattern relative to the roadway. In order to obstruct the traffic on the roadway as little as possible, it is expedient when the parking procedure is performed from a position which is located parallel in relation to the roadway, so that the vehicle does not protrude far into the roadway.

Furthermore, it can be provided that an object, in particular a further vehicle, is detected at the parking space and the starting region is determined at a predetermined distance from the object. In principle, the starting region can also be determined (only) as a function of the roadway and the parking space or the parking area, but it is generally advantageous when (all) objects in the relevant surrounding area are taken into the account for determining the starting region. Therefore, a predetermined distance should be kept, for example, from vehicles in the area surrounding the parking space. Other distances could also be prespecified in relation to other objects.

In a further version, the starting region is situated at a distance from the target position which is smaller than a prespecified maximum distance. If parked, for example, in a parking space parallel in relation to the roadway, the vehicle in the ideal parking position, that is to say in the target position, has a specific position value in the direction of travel of the roadway. For reverse-parking, it is necessary to move the vehicle in front of this position value in the direction of travel in order to then be able to reverse-park the vehicle. The distance from the position value of the target position in the direction of travel to the position value in the starting region likewise in the direction of travel is defined as the maximum distance here. In the present example, this maximum distance should not be overshot.

Traffic in the area surrounding the vehicle is preferably taken into account during the automatic guiding or driving. This means that the surrounding area is dynamically analysed in respect of other road users. For example, a vehicle should be driven into the parking space only when the following traffic is still at a prespecified distance from the vehicle in question. The parking trajectory may also be selected to be different when no traffic is detected in the surrounding area in comparison to the case in which a large amount of traffic is detected.

In a special refinement, the method can be aborted if the vehicle does not reach the starting region under prespecified conditions. By way of example, there is a very large amount of traffic in the area surrounding the parking space, and therefore the vehicle cannot automatically drive out of the parking space into the starting region. In this case, it is expedient when the procedure is aborted. Furthermore, it may be the case that the starting region cannot be reached from the current position in the parking space by the vehicle at all.

In this case too, it is expedient when the procedure is aborted. If necessary, the driver then has to search for a different parking space.

According to a further refinement, it can be provided that the process of recording the data relating to the area surrounding the vehicle is automatically activated when the vehicle falls below a prespecified speed. That is to say, when the vehicle, as is typical in a parking procedure, is very slow, it is advantageous when the sensor system of the vehicle automatically begins to record the surrounding area. This is particularly expedient when automatic parking is only activated after or during abortion of a manual parking attempt since data for a possible procedure for driving out of a parking space can be acquired in good time by automatically activating the sensor system. The driver then does not have to be concerned with switching on any sensor system of the vehicle in a situation which is already very demanding. In addition, automatically activating the sensor system for recording the data relating to the surrounding area is also advantageous when the parking assistant is not yet activated during the manual parking attempt. During the manual parking attempt, the vehicle has then already recorded the surrounding area and, respectively, the parking space and can use the recorded data relating to the surrounding area for driving out of the parking space in an automated or automatic manner after the aborted parking attempt. As a result, the data relating to the surrounding area is already available during activation of the parking assistant and it does not still have to be obtained first.

The parking assistant can advantageously be configured in respect of certain parameters. For example, it is particularly advantageous when that side of the vehicle on which a driver drives the vehicle is configured in the parking assistant. In the case of left-hand-drive vehicles, the parking assistant should be configured, in particular for partially automatic parking, for drivers on the left-hand side, and for drivers on the right-hand side in the case of right-hand-drive vehicles. The respective drivers can be better assisted in this way.

In a further refinement, data from a navigation system is used when determining the starting region. Under certain circumstances, specifically the sensors of the vehicle cannot fully record the starting region. In this case, it is expedient when the vehicle or the parking assistant can refer to geographical data of a navigation system. The starting region may be determined both on the basis of the data of the navigation system and also on the basis of the data of the vehicle.

According to the invention, the object formulated above is also achieved by a vehicle comprising a parking assistant which facilitates execution of a completely manual attempt to park in a parking space and which facilitates activation of said parking assistant in the parking space, and a sensor device for recording data relating to the area surrounding the vehicle, wherein the parking assistant is designed to determine a starting region outside the parking space for automatically parking the vehicle in the parking space on the basis of the data relating to the surrounding area, automatically guiding or driving the vehicle out of the parking space into the starting region, and automatically parking the vehicle in the parking space from the starting region.

The possible variations and advantages outlined above in connection with the method according to the invention can be applied in the same sense to the vehicle according to the invention. In this case, the respective method features represent functional features of respective means of the vehicle.

The features and combinations of features that are cited in the description above and also the features and combinations of features that are cited in the description of the figures below and/or are shown in the figures alone can be used not only in the respectively indicated combination but also in other combinations without departing from the scope of the invention. Therefore, embodiments of the invention that are not explicitly shown and explained in the figures, but emanate and can be produced from the explained embodiments by virtue of separate combinations of features, are also intended to be regarded as included and disclosed. Embodiments and combinations of features that therefore do not exhibit all of the features of an independent claim as originally formulated are also intended to be regarded as disclosed. Furthermore, embodiments and combinations of features that go beyond or differ from the combinations of features set out in the back-references of the claims are intended to be regarded as disclosed, in particular as a result of the embodiments set out above.

The present invention will now be explained in more detail with reference to the appended drawings, in which.

Figure 1:
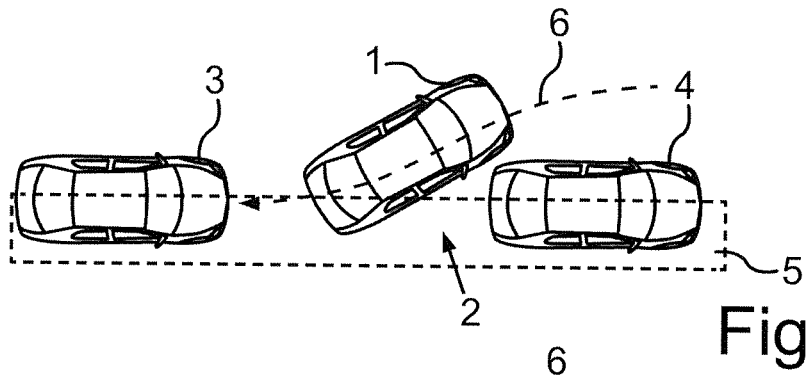
FIG. 1 shows a successful parking situation.

The following examples can relate to all kinds of vehicles for which parking is desired. The parking spaces can be arranged parallel in relation to the roadway, perpendicular in relation to the roadway or at any other angle in relation to the roadway. The examples show corresponding methods, but at the same time also the required design of the parking assistants of vehicles.

If the vehicle is stuck in a parking space, for example during an unsuccessful parking attempt, parking should nevertheless be successfully completed if at all possible. Therefore, the objective of the present invention is to automatically or partially automatically move a vehicle, after a manual parking attempt, to a position from where the parking manoeuvre can be automatically successfully completed. Therefore, manual parking should be supplemented with automatic or partially automatic parking. In this case, it is particularly important that automated parking first begins in an, albeit unsuccessful, parking situation.

Therefore, the driver first begins to manually manoeuvre his vehicle into a parking space. However, during the parking procedure, the said driver realizes that he cannot successfully complete the parking procedure manually. He therefore wishes that the parking assistant, that is to say the automatic or partially automatic parking system of the vehicle, relieves him of this task and the vehicle can be moved into the parking space at least with the assistance of the parking assistant. To this end, the said driver aborts the manual parking procedure, for example, by activating the parking assistant.

The parking assistant analyses the surrounding area and, in particular, the parking space and also the position and orientation of the vehicle in question. If the parking assistant establishes that parking is directly possible from the current position, it will carry this out, for example, automatically. To this end, the parking assistant may only have to engage the reverse gear in order to arrive at a target position in the parking space.

If, however, the automatic system or the parking assistant cannot complete the parking procedure by simply engaging the reverse gear and it is necessary to drive the vehicle forward slightly, the situation arises that the vehicle has to be driven into oncoming traffic. For the purpose of driving forwards or correspondingly driving out of the undesired position in the parking space, a trajectory to a position from which the vehicle can be successfully parked now has to be established. It is now necessary for a starting region outside the parking space, into which starting region the vehicle is driven from the current position and from which the vehicle can reach the target position in the parking space during parking, is ascertained in the undesired position in the parking space. In this case, it is not absolutely necessary for the vehicle to be moved to an exact position outside the parking space (so-called OK position). Instead, it is sufficient when the vehicle is moved as quickly as possible into a region in which any OK position is present. The parking assistant can reach the target position in the parking space from each of the said OK positions in the starting region.

In the case of a parallel parking procedure, the starting region into which the vehicle is intended to be moved for a successful parking procedure can be ascertained as follows:
a) The starting region should be oriented parallel in relation to an object (in particular vehicle) which delimits the parking space.
b) The starting region should be located at a configurable distance from the object.
c) The starting region should be situated within one or more configurable maximum distances from the parking space (for example maximum distance in the X direction and maximum distance in the Y direction).
d) The trajectory for driving the vehicle into the starting region should be selected such that the approaching traffic is obstructed as little as possible when driving along the trajectory.

The maximum distances selected above under c) allow, under normal circumstances, for the vehicle to find an OK position in the start region before it overshoots the maximum distance. If an OK position is not reached within this maximum distance, the manoeuvre is, for example, aborted.

Further boundary conditions which can influence the parking procedure are taken into consideration below. For example, a parking space searching algorithm can be automatically activated below a predetermined speed, for example 20 km/h. Therefore, a parking space is, for example, automatically recorded when the vehicle slowly approaches this parking space. The dimensions of the parking space can be updated by new measurements being carried out when the driver steers the vehicle into the parking space.

Irrespective of the automatic parking space searching algorithm, trajectory planning can be activated. This trajectory planning can be, for example, part of a function which has to be activated by the driver. By way of example, the driver would only activate trajectory planning if he becomes stuck during the manual parking procedure. However, if the parking space searching algorithm has not been activated, helpful measurements can nevertheless be carried out. As long as specifically the vehicle is located in the parking space, the sensors of the vehicle can sense obstacles in the front region and in the rear region. From this, the system calculates a possible starting region in which the vehicle can reach OK positions. The parking assistant or the system can then drive the vehicle, for example in a fully automatic manner, into this starting region. However, a requirement for this was that the driver activates the parking assistant.

If the parking space searching algorithm was already activated, data about the parking space is available. If the parking space searching algorithm was not yet activated, several parameters may have to be noted for activation purposes. For example, the side on which the driver is driving should be indicated during activation. The driver can indicate the side on which he is driving, for example, using an indicator signal when activating the system. If the driver does not select the side, the system or the parking assistant can determine the side based on whether the vehicle is a left-hand-drive or right-hand-drive vehicle, that is to say whether the vehicle was purchased, for example, in Great Britain or in Germany. In the case of left-hand-drive operation, the standard option would mean, for example, that the vehicle is parked on the right-hand-side of the roadway, and vice versa.

A further option could be to use road network data of a navigation system in order to check the direction of traffic. The parking side could in turn be determined from the said direction of traffic.

When the driver activates the parking assistant, the said parking assistant will provide a standard parking manoeuvre based on the dimensions of the parking space and the position of the vehicle. This can be provided, for example, for perpendicular parking forwards and backwards or parallel parking. The driver can then select the standard manoeuvre or another manoeuvre on the screen.

Situations such as parking on the incorrect side of the road, for example in a one-way street, can also be managed. In this case, road network data or navigation data can be used for example. Otherwise, the aspects listed above, according to which the driver manually selects the side or the side is selected depending on whether the vehicle is a left-hand-drive or right-hand drive vehicle, can be selected on a logical basis.

Specific parking situations will now be described in detail with reference to FIGS. 1 to 4. According to FIG. 1, the vehicle 1 in question should be parked in a parking space 2 which is located between two further vehicles 3 and 4 which are positioned one behind the other. During parking, the vehicles are positioned, for example, with one side in a parking lane 5. The parking lane 5 runs parallel in relation to the roadway, not indicated in FIG. 1.

The vehicle 1 will usually reverse-park into the parking space 2. The parking procedure was initially manually started in accordance with the trajectory 6. The manual procedure is aborted in the situation illustrated in FIG. 1. The driver now activates the function "automatically complete manual parking procedure". The vehicle 1 is therefore already partially located in the parking space and the parking assistant should now take over the task of completing the parking procedure. The sensor system of the vehicle 1 now provides data for the parking assistant, which data it had already previously obtained, that is to say before activation of the parking assistant, or which it obtains or will obtain only after activation of the parking assistant. This data relating to the surrounding area relates, for example, to the size of the parking space 2, to the relative position of the vehicle 1 with respect to the parking space 2 and/or to the roadway in front of the parking space 2. Other data (for example navigation data) can also be recorded or received by the vehicle 1 and utilized for the parking procedure.

In the present example, the parking assistant identifies that the vehicle is already located on a suitable trajectory 6 and the parking procedure can be automatically completed on this trajectory 6 without further manoeuvres. Therefore, the vehicle 1 automatically drives into the parking space 2 along the trajectory 6.

Figure 2:
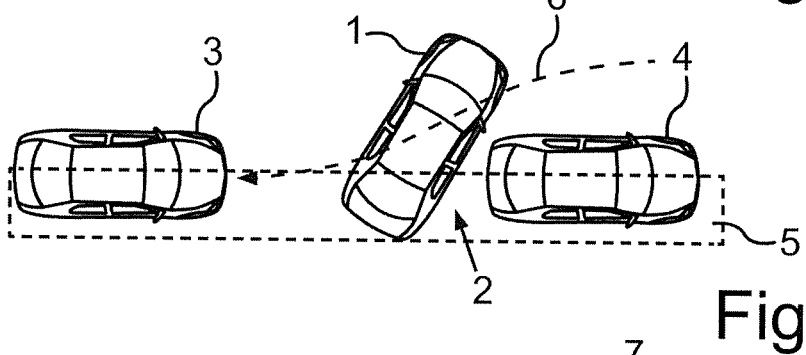
FIG. 2 shows an unsuccessful parking situation.

The same static starting position prevails in the example of FIG. 2. The vehicle 1 is intended to be parked in a parking space 2 between the vehicles 3 and 4 which are positioned one behind the other. The driver initially selects manual parking here too. However, the said driver deviates from the ideal trajectory 6 and enters the parking space 2 at too sharp an angle. The said driver is no longer able to compensate for this by more intense steering. The vehicle 1 "is stuck in the parking space 2". The parking attempt by the driver of the vehicle 1 is therefore unsuccessful. The driver could free himself from this situation only by driving out of the parking space 2 again and performing a new parking attempt. Instead of a renewed attempt, the driver then activates the parking assistant in the situation illustrated in FIG. 2. This means that he selects the function "abort manual parking and complete automatically".

Figure 3:
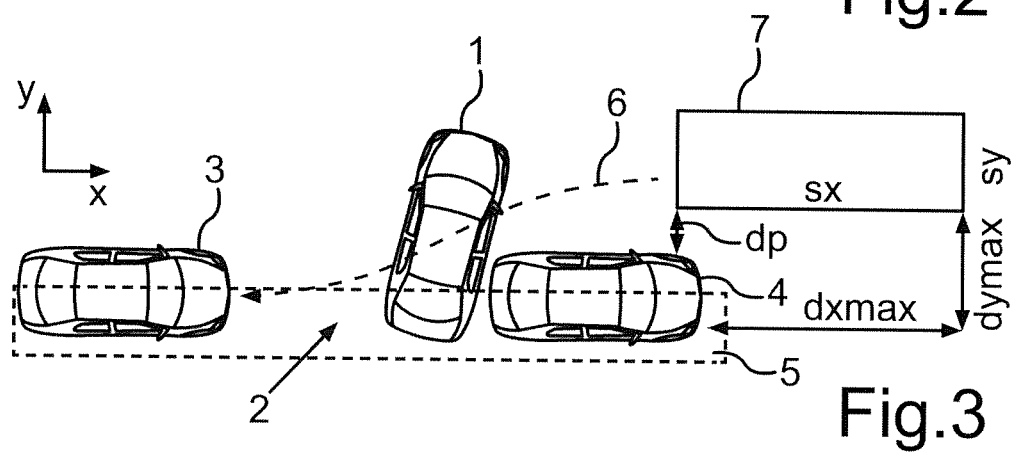
FIG. 3 shows the process of determining a starting region for a successful parking procedure.
Figure 4:
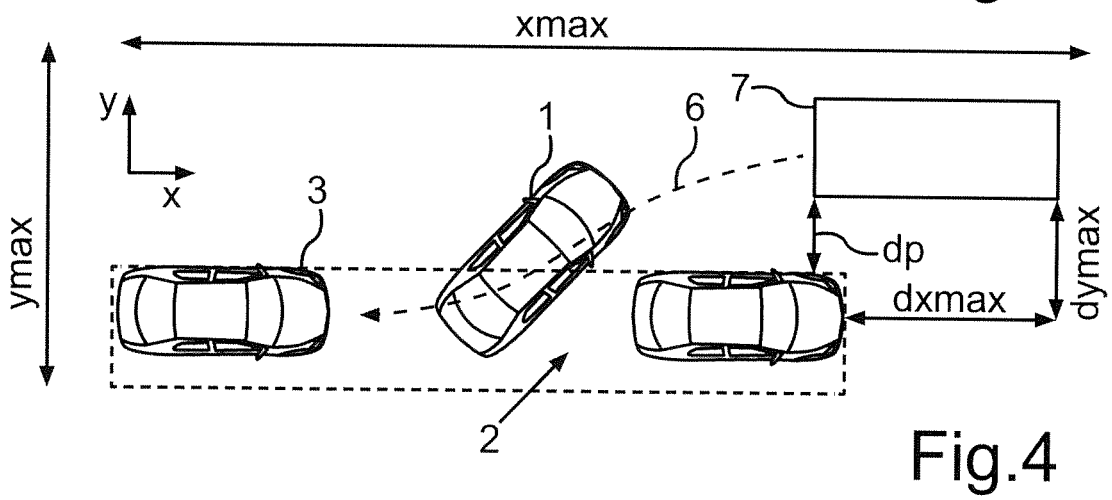
FIG. 4 shows the process of determining the starting region within prespecified limits.

In this situation, the further method according to FIGS. 3 and 4 is executed. In particular, the vehicle 1 is now automatically driven into a starting region 7 from which parking in the parking space 2 is readily possible.

The starting region 7 is preferably selected such that it obstructs the approaching traffic as little as possible. To this end, limits can be prespecified for the starting region 7. For example, the starting region may be a rectangle which is located on the roadway. On the basis of the x-y coordinate system (x-direction corresponds to the direction of travel and y-direction extends perpendicular thereto), the starting region 7 can have an extent sx in the x-direction and an extent sy in the y-direction. These variables are optionally configurable, as are the following distances dp, dxmax and dymax. In this case, the distance dp means the distance of the starting region 7 from the object delimiting the parking space 2, specifically vehicle 4 here. The distance dxmax describes, for example, the maximum distance which may be assumed by the starting region 7 in the direction of travel x in relation to the front vehicle 4 in front of the parking space 2. The distance dymax describes, for example, the distance of the starting region 7 from the right-hand edge (with respect to the direction of travel) of the vehicle 1 in its target position in the parking space 2.

The said variables or distances sx, sy, dp, dxmax and dymax can be configured in advance and/or can be automatically changed by the parking assistant during the parking procedure.

Furthermore, the entire parking procedure, including the starting region 7, can be restricted to a maximum area. This maximum area can be prespecified, for example, by an extent xmax in the x-direction and an extent ymax in the y-direction. This area can be defined with respect to the parking space 2. This maximum area can optionally be adapted, for example, to the respective traffic situation by the parking assistant. In each case, the parking assistant has to select the starting region 7 and the trajectory 6 such that the vehicle does not leave the maximum area during the parking procedure. The vehicle can now be automatically or possibly also semi-automatically driven into the parking space from the starting position in the starting region 7. In the present case, the vehicle thus reverses from the starting region 7 into the parking space 2 after it has first been automatically driven forward into the starting region 7.

If the vehicle cannot be driven into the starting region 7 from the situation of FIG. 3, in which the vehicle 1 is "stuck" in the parking space 2, the method is preferably automatically aborted. Abortion of this kind can also be provided when the parking assistant identifies that the parking space is too small for example.

The invention claimed is:

1. A method for parking a vehicle in a parking space with a driver and a parking assistant, comprising:
   initially executing, by the driver, a completely manual attempt to park in the parking space;
   activating the parking assistant of the vehicle in the parking space when the completely manual attempt is unsuccessful;
   recording, by the parking assistant, data relating to a surrounding area of the vehicle;
   determining, by the parking assistant, a starting region outside the parking space for automatic parking of the vehicle in the parking space by the parking assistant on the basis of the data relating to the surrounding area,
   automatically driving, by the parking assistant, the vehicle out of the parking space into the starting region, and
   automatically parking or displaying a trajectory for driving, by the parking assistant, the vehicle into the parking space from the starting region.

2. The method according to claim 1, wherein the vehicle is automatically guided into the starting region, the parking assistant ascertains whether the vehicle is in a starting position in the starting region and, when the vehicle is in the starting position in the starting region, the vehicle is automatically or semi-autonomously parked in the parking space from the starting position.

3. The method according to claim 1, wherein the vehicle is automatically driven to a target position in the parking space by the parking assistant.

4. The method according to claim 1, wherein the starting region is situated parallel in relation to a roadway on which the parking space is located.

5. The method according to claim 1, wherein an object in the form of a further vehicle is detected at the parking space and the starting region is determined at a predetermined distance from the object.

6. The method according to claim 3, wherein the starting region is situated at a distance from the target position which is smaller than a pre-specified maximum distance.

7. The method according to claim 1, wherein traffic in the area surrounding the vehicle is taken into account during the driving.

8. The method according to claim 1, wherein the method is aborted if the vehicle does not reach the starting region under pre-specified conditions.

9. The method according to claim 1, wherein the process of recording the data relating to the surrounding area of the vehicle is automatically activated when the vehicle falls below a pre-specified speed.

10. The method according to claim 1, wherein the parking assistant is configured based on a driver side of the vehicle.

11. The method according to claim 1, wherein data from a navigation system is used when determining the starting region.

12. A vehicle with a driver, comprising:
    a parking assistant which facilitates an initial execution of a completely manual attempt by the driver to park in a parking space and activates the parking assistant; and
    a sensor device for recording data relating to a surrounding area of the vehicle,
    wherein the parking assistant is configured to, when the completely manual attempt is unsuccessful:
       determine a starting region outside the parking space for automatically parking the vehicle in the parking space on the basis of the data relating to the surrounding area,
       automatically driving the vehicle out of the parking space into the starting region, and
       automatically parking the vehicle from the starting region into the parking space.

* * * * *